INVENTOR
WILHELM K. KOLSTER
BY
Smythe & Moore
ATTORNEYS

Aug. 12, 1969     W. K. KOLSTER     3,460,385
COMPARISON CALORIMETER
Filed April 12, 1966     3 Sheets-Sheet 3
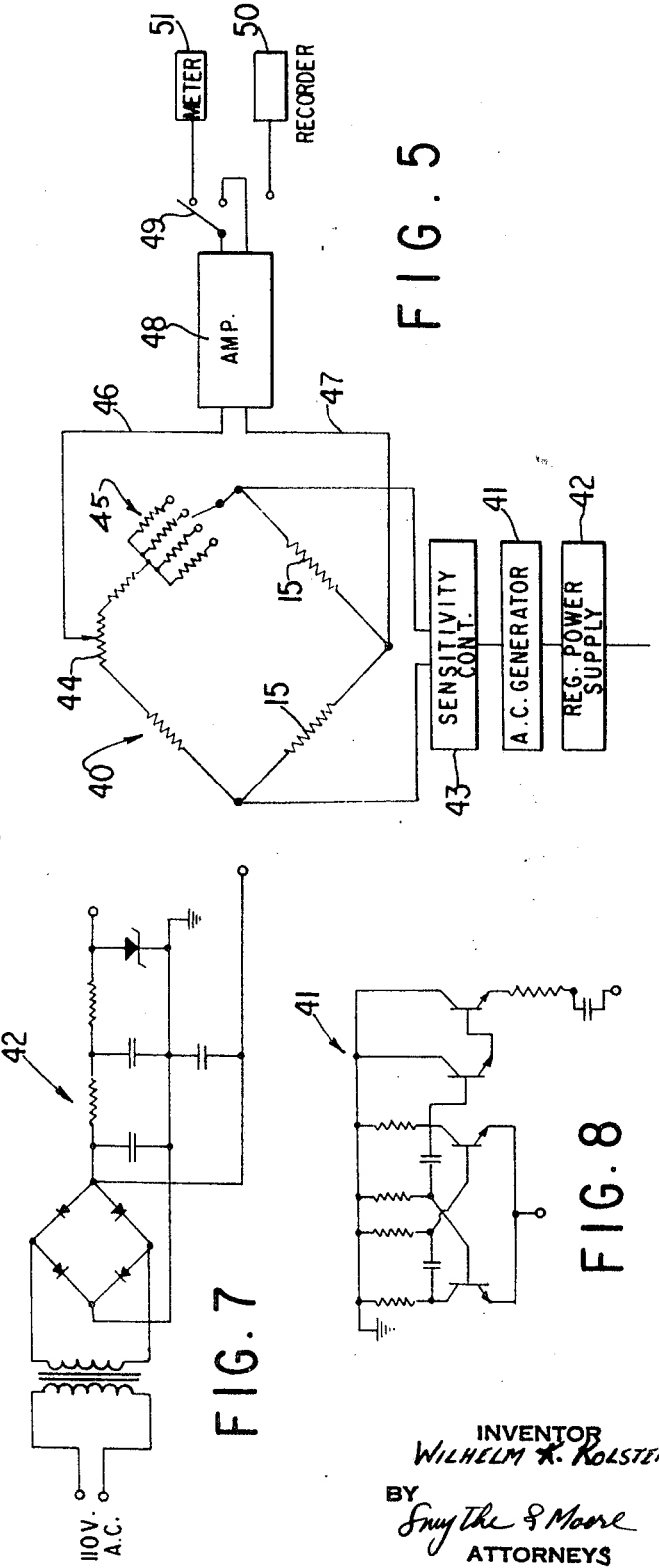
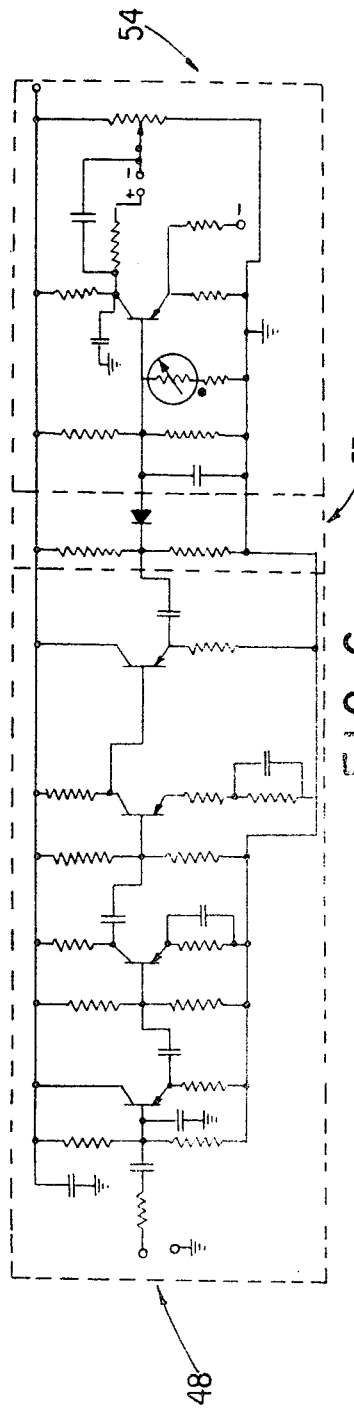
INVENTOR
WILHELM K. KOLSTER
BY
Smythe & Moore
ATTORNEYS

United States Patent Office 3,460,385
Patented Aug. 12, 1969

3,460,385
COMPARISON CALORIMETER
Wilhelm K. Kolster, Michigan City, Ind., assignor, by mesne assignments, to George F. Johnson, Terre Haute, Ind., and Raymond R. Kubly, Jr., Monroe, Wis., as tenants-in-common
Filed Apr. 12, 1966, Ser. No. 541,997
Int. Cl. G01k 17/00
U.S. Cl. 73—190                              9 Claims

ABSTRACT OF THE DISCLOSURE

A calorimeter of the comparison type for determining the heating value of a tested gas including a pair of burners for burning a reference gas, a heat sink, a pair of temperature sensing means, and means connected with the temperature sensing means for indicating differences in heating between the reference gas and the tested gas.

---

This invention relates to calorimeters and more particularly to a calorimeter for comparison of gases to determine the B.t.u. or heating value of an unknown gas.

Prior devices of this character have been vulnerable to changes in ambient temperature and other external conditions. These devices have also been complicated and relatively expensive, and have not been completely satisfactory in the accuracy of indication under varying conditions.

One of the objects of the present invention is to provide a relatively simple calorimeter which will not be affected by ambient temperature or ambient conditions.

A further object of the invention is to provide a calorimeter of the comparison type in which a heat sensitive mass associated with a temperature sensor operates in a region of controlled temperature and other ambient conditions.

A further object of the invention is to provide a new and improved calorimeter of the comparison type.

In one aspect of the invention, the calorimeter may comprise a pair of Bunsen-type burners enclosed in an insulated housing and adapted to heat masses of material having temperature-sensitive elements associated therewith. The heat-sensitive masses and sensors are surrounded by a solid metallic heat sink maintained at a constant temperature and protecting the elements from temperature and other changes in ambient conditions. The temperature sensors operate a B.t.u. recorder, meter, or the like.

The foregoing and other objects, advantages and features of the invention will be apparent from the following description taken in connection with the accompanying drawings which are merely exemplary.

In the drawings:

FIG. 5 is a block diagram of a control circuit adapted for use with the calorimeter of the invention;

FIG. 6 is a wiring diagram of the amplifier of FIG. 5 for operating a recorder or meter device;

FIG. 7 is a wiring diagram of the regulated power supply of FIG. 5; and

FIG. 8 is a wiring diagram of the A.C. generator of FIG. 5.

Figure 1:
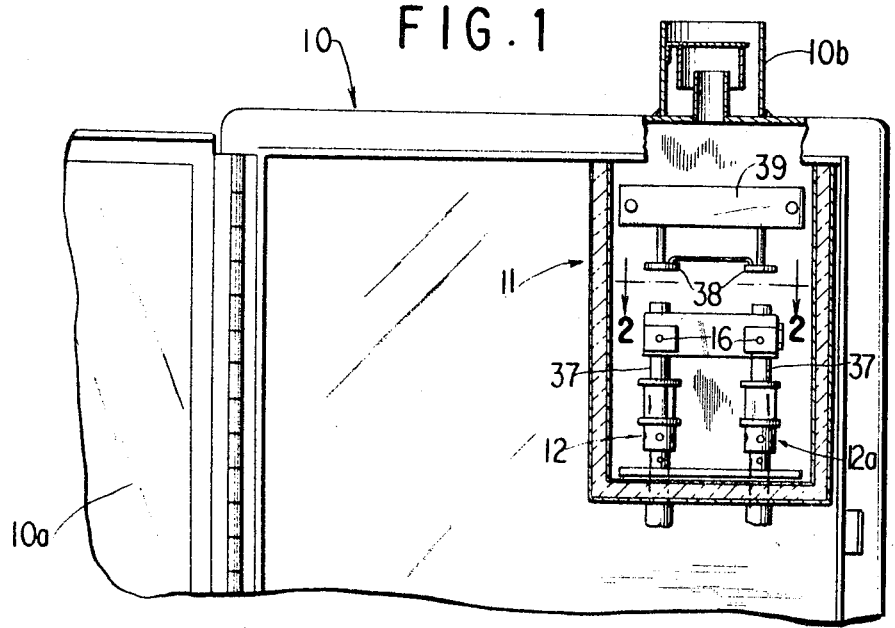
FIG. 1 is a broken view of an instrument housing containing a calorimeter exemplifying the invention.
Figure 2:
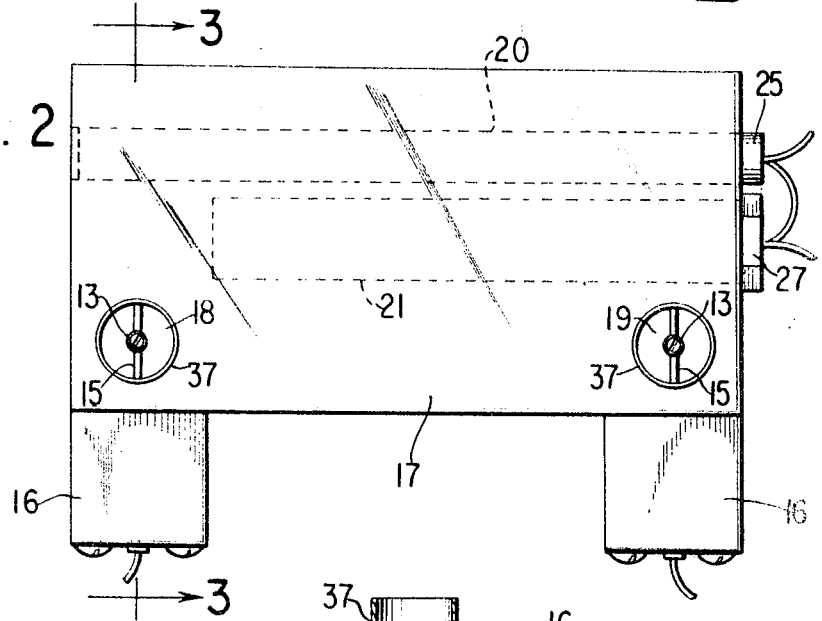
FIG. 2 is an enlarged view of the calorimeter taken generally along the line 2—2 of FIG. 1.
Figure 3:
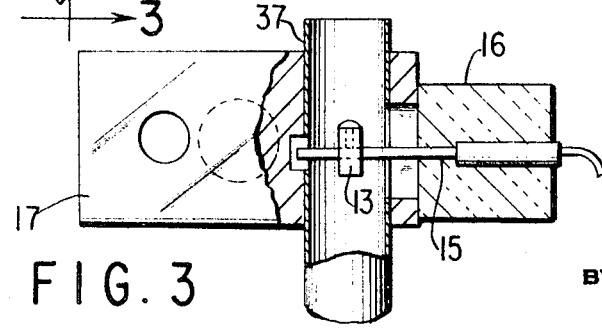
FIG. 3 is a view partially in section, taken generally along the line 3—3 of FIG. 2.

Referring to the drawings, and more particularly to FIG. 1, there is shown a housing or casing 10 having a hinged cover 10a and a chimney or flue 10b for combustion gases. Contained within the housing 10 is a suitably insulated chamber 11 adapted to contain the calorimeter of the present invention, the remaining space in the housing being adapted to contain various parts of the gas supply and electrical stystems. The calorimeter assembly comprises a pair of burners 12 and 12a, one of which burns a standard or reference gas and the other a gas the B.t.u. of which is to be determined. The products of combustion from each of the burners are directed upwardly toward a separate mass of material 13 of generally cylindrical shape (FIGS. 2 and 3), which absorbs heat from the combustion gases. Each mass 13 is mounted on a temperature sensor 15 carried by a block 16 mounted on the side of a solid metallic heat sink 17 provided with apertures 18 through which the sensors 15 project. Blocks 16 are preferably of suitable heat-insulating material such as polytetrafluoroethylene.

The heat sink 17 serves to maintain a stable environment for the masses of material 13 being heated by the combustion gases and is provided with a pair of vertically extending apertures 18 and 19 within which the masses 13 are mounted and through which the combustion gases flow. Heat sink 17 is also provided with a horizontally extending opening or bore 20 for receiving an electrical heater 25, and with a second horizontal opening or bore 21 adapted to receive a thermo-sensitive element 27 such as a suitable thermal switch arrangement.

Figure 4:
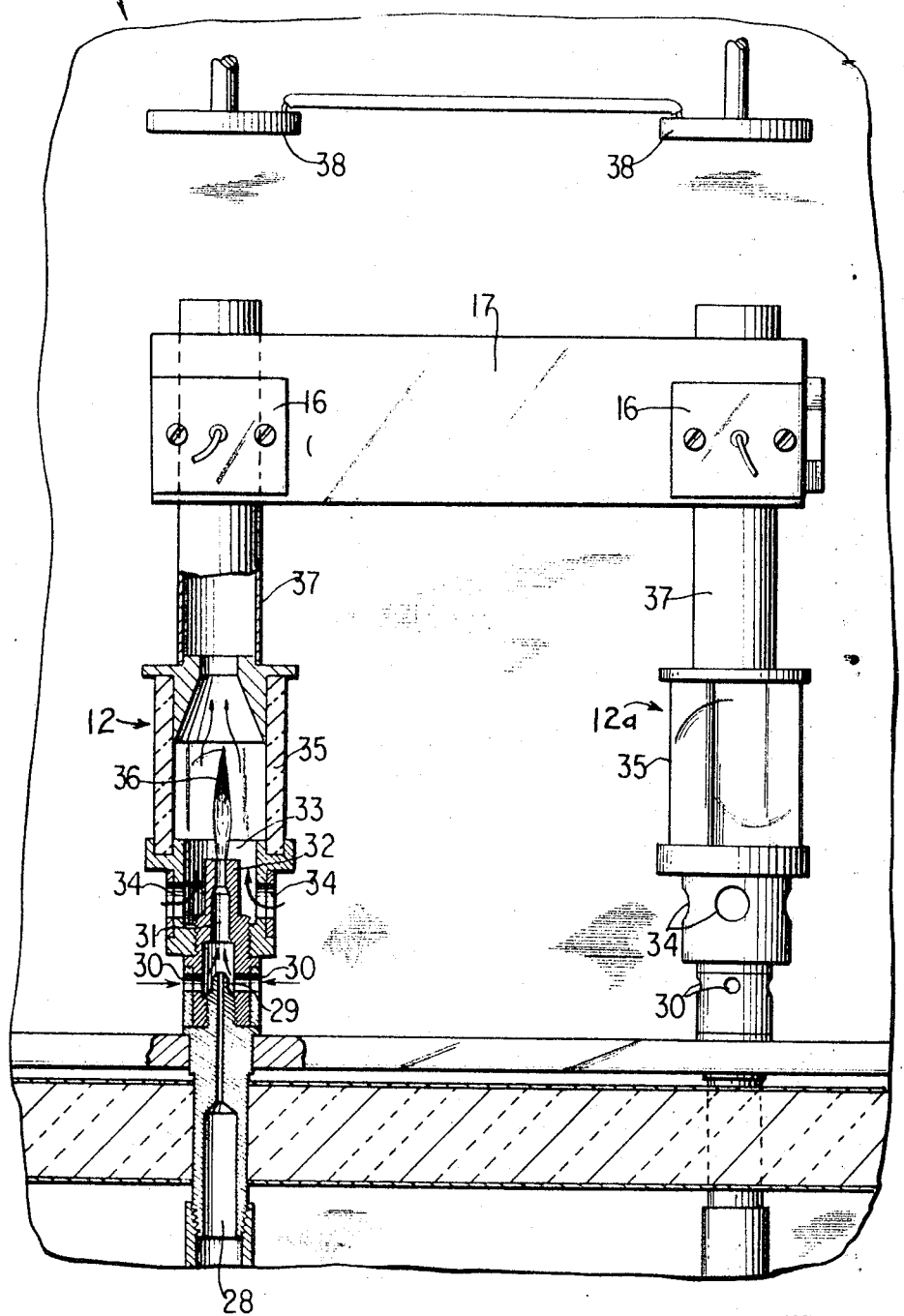
FIG. 4 is an enlarged elevational view, partly in section, of the calorimeter assembly of FIG. 1.

One of the burners, such as 12 of FIG. 1, will now be described. Referring to FIG. 4, gas enters through a passage 28 in the bottom of the burner and passes through a nozzle 29 to draw primary air into the burner through passages 30. The mixture of primary air and gas then passes through a passage 31 and a nozzle 32 into a combustion chamber 33, drawing secondary air into the chamber 33 through passages 34. Chamber 33 may be surrounded, if desired, by a suitable transparent wall 35. The gas is burned in chamber 33 as indicated at 36, and the heated combustion products pass upwardly through a chimney 37 where they impinge upon the mass 13 which is heated and the temperature thereof sensed by the temperature sensor 15.

As further shown in FIGS. 1 and 4, a thermal switch 38 is preferably positioned above each of the burners 12 and 12a in the path of combustion gases issuing from the chimney 37. Switches 38 may be mounted on a suitable bracket 39 (FIG. 1) and provide for cutting off the gas supply to the burners in a well known manner in the event one or both of the burners become extinguished.

As shown in FIG. 5, the temperature sensors 15 are located in two legs of a bridge circuit 40. The input to bridge 40 is composed of an A.C. signal generated by an A.C. generator 41 fed from a regulated power supply 42 which maintains a constant supply voltage and therefore a constant output from generator 41. The output of generator 41 passes through a sensitivity control 43 into bridge circuit 40. The sensitivity control permits a variation of supply voltage to the bridge circuit to adjust the sensitivity of the recording needle to different values of changes in B.t.u. on a graduated recording tape of a recording instrument. The other two legs of bridge 40 are connected to one of the bridge output terminals through a potentiometer 44 or the like, which permits lateral adjustment or positioning of the recorder needle on the recorder tape. One of these latter legs also contains a range switch 45 which connects different values of resistance into the leg to adjust for gases having different B.t.u. content. The output of bridge 40 is fed through conductors 46 and 47 to an amplifier 48 having its output connected through a switch 49 to a recorder 50, meter 51, or like indicating device.

Amplifier 48 consists of three basic circuits or elements as seen in FIG. 6. The first element is an A.C. amplifier shown generally within box 52. Next is a detector circuit, in box 53, to convert A.C. to D.C., and last, a stabilized D.C. amplifier shown in box 54 with a suitable output to drive a zero to 1 milliamp D.C. recorder 50, FIG. 5. FIG. 7 illustrates a circuit for the regulated power supply 42, and FIG. 8 shows a circuit for the A.C. generator or oscillator 41. Since the circuits in FIGS. 6–8 are not an integral part of the calorimeter, further description is believed unnecessary, their operation being readily apparent to those skilled in the art of electronic circuitry.

In operation of the calorimeter, a standard gas of known B.t.u. and another gas of known B.t.u. will first be fed to the burners 12 and 12a to determine the proper setting of the range switch 45, the positioning control 44 and the sensitivity control 43. Following this adjustment, the gas to be tested will be substituted for the second gas, and the products of combustion from each burner heat its associated mass 13 and temperature-sensing element 15. While a temperature-sensing element alone may be used, the use of its associated mass 13 increases reaction time and makes the recording of changes in B.t.u. of the tested gas more stable and accurate. Temperature differences between the respective masses 13 are compared in the bridge circuit 40, amplified, and recorded or indicated in some suitable indicating mechanism. In order to eliminate the effects of outside environment, the heat sink 17 is maintained at a predetermined temperature by heater 25 and thermostatic switch 27, preferably at a temperature above that of the combustion gases being compared. As an example, the temperature at the sensor may be for a gas of 1000 B.t.u. at 200° F. The heat sink 17 may be made of aluminum, and the approximate size may be 1½ inches high by 3 inches wide by 6 inches long. The block is then maintained at 230° F. With such an arrangement, it has been found that the B.t.u. difference between the gases can be recorded or indicated at plus or minus one (±1) B.t.u. The amount of power input to the heat sink might be in the range of an intermittent 200 watt.

By carefully controlling the temperature of the sink 17, the temperature difference between the sensors will be in the nature of the fourth power of the temperature of the two sensors, and the heat transfer will be radiation rather than conduction or convection.

Having thus described the invention, it will be apparent that various changes, modifications and substitutions may be made in the illustrated embodiment without departing from the spirit of the invention, and it is intended that the scope of the invention be limited only by the scope of the appended claims.

What is claimed is:

1. In a calorimeter of the comparison type for determining the heating value of a tested gas, the combination of a pair of burners for burning a reference gas and a gas to be tested, a heat sink having two separate passageways, one receiving products of combustion from one of said burners, and the other receiving products of combustion from the other of said burners, a pair of temperature sensing means positioned within the environment of said heat sink, one being adjacent to each of said passageways, each of said sensing means being subjected to the temperature of products of combustion of its respective burner, means for maintaining said heat sink at a substantially constant temperature, and means connected with said temperature sensing means for indicating differences in heating between said reference gas and the tested gas.

2. A combination as set forth in claim 1 in which the heat sink comprises a substantially solid block of metal.

3. A combination as set forth in claim 1 in which the heat sink is maintained at a temperature above that of the products of combustion to which the temperature sensing means is subjected.

4. A combination as set forth in claim 1 in which a mass of solid heat absorbing material operatively associated with said temperature sensing means is positioned in the path of said products of combustion passing through said heat sink.

5. A combination as set forth in claim 4 in which said mass of heat absorbing material is mounted on said temperature sensing means.

6. A combination as set forth in claim 4 in which said heat sink comprises a substantially solid block of metal having vertical openings through which the products of combustion pass and horizontally disposed openings for containing the means for maintaining said sink at a substantially constant temperature.

7. A combination as set forth in claim 6 in which said masses and said temperature sensing means are positioned within said vertical openings of said heat sink.

8. A combination as set forth in claim 1 in which said temperature sensing means comprises two temperature sensing elements respectively connected in legs of a bridge for an indicating circuit means.

9. A combination as set forth in claim 1 wherein an electric heating means is associated with said heat sink and a thermostatic control means is used to maintain said heat sink at a predetermined temperature.

References Cited

UNITED STATES PATENTS

| 2,120,791 | 6/1938 | Schmidt | 73—190 |
| 3,099,160 | 7/1963 | Werner et al. | 73—342 |
| 3,175,397 | 9/1965 | Niedergesass | 73—190 |

JAMES J. GILL, Primary Examiner

H. GOLDSTEIN, Assistant Examiner

U.S. Cl. X.R.

73—15